United States Patent [19]

Hasegawa et al.

[11] Patent Number: 4,719,525
[45] Date of Patent: Jan. 12, 1988

[54] TRACK POSITION CORRECTION FOR A HELICAL SCAN MAGNETIC PLAYBACK

[75] Inventors: Tsunao Hasegawa; Ichiro Miyake; Ryuichiro Yoshimura, all of Saitama, Japan

[73] Assignee: Pioneer Electronic Corporation, Tokyo, Japan

[21] Appl. No.: 853,291

[22] Filed: Apr. 17, 1986

[30] Foreign Application Priority Data

Apr. 17, 1985 [JP] Japan .................................. 60-81693
Apr. 24, 1985 [JP] Japan .................................. 60-87841

[51] Int. Cl.⁴ .............................................. G11B 5/58
[52] U.S. Cl. ...................................... 360/77; 360/10.2
[58] Field of Search ........................... 360/10.2, 77, 78

[56] References Cited

U.S. PATENT DOCUMENTS

| | | | |
|---|---|---|---|
| 4,438,463 | 3/1984 | Sakamoto | 360/10.2 |
| 4,451,860 | 5/1984 | Honjo et al. | 360/77 |
| 4,539,604 | 9/1985 | Namiki | 360/10.2 |
| 4,550,351 | 10/1985 | Hamalainen | 360/77 |
| 4,587,580 | 5/1986 | Takayama et al. | 360/77 |
| 4,590,523 | 5/1986 | Honjo et al. | 360/77 |

*Primary Examiner*—Robert L. Richardson
*Attorney, Agent, or Firm*—Sughrue, Mion, Zinn, Macpeak & Seas

[57] ABSTRACT

A control circuit for a helical scan playback, in which a rotary head is moved transversely by a varying amount. The transverse movement can be either a multi-valued tracking position error correction signal or a saw-tooth waveform, effective during a location data strip, for compensating for the fast movement of the tape during a scan operation.

8 Claims, 13 Drawing Figures

TRACK POSITION CORRECTION FOR A HELICAL SCAN MAGNETIC PLAYBACK

BACKGROUND OF THE INVENTION

This invention relates to a helical scan magnetic playback typical of video tape recorders. In particular, the invention relates to a large transverse correction of the rotary drum, either for start-up conditions or to compensate for fast tape movement.

In a conventional ½ inch video tape recorder, a magnetic tape is wound around an angle of 180 degrees on a rotary drum having two rotary heads A and B mounted 180 degrees apart from each other so as to record video data by alternately selecting one of the two rotary heads A and B using a switching pulse (SWP). The rotary drum rotates with a sliding movement with respect to the inclined tape. In that case, there is formed a track for each field, the track being tilted to the travel direction of the magnetic tape. On the other hand, audio data is recorded on a track in parallel with the travel direction of the magnetic tape or the tilted track in combination with video data after the video data has been subjected to frequency modulation.

In the recent so-called standardized 8 mm video tape recorder, a magnetic tape is wound instead around an angle of 221° on a rotary drum to record ordinary video data in its 180° area, whereas digital (PCM) audio data is recorded in the 36° area (the remaining 5° area being a margin for video data). As shown in FIG. 1, video and audio areas are formed on the tilted track of the magnetic tape in such a 8 mm video tape recorder. In the PCM area, there is recorded coded data (location data) for retrieving the initial point of a numbered program or of the magnetic tape, the elapsed time (hour, minute, second) from the initial point of the program, recording date, etc. in addition to the audio signal in the form of PCM (pulse code modulated) data. In consequence, it is possible to retrieve a given location (program) on a magnetic tape by reading the code.

When a given location is to be retrieved, the magnetic tape is caused to travel at high speed in order to shorten the retrieval time. As shown in FIG. 1, for instance, while the rotary head (A or B) traces the magnetic tape once from its lowermost edge to its uppermost edge when the tape is rewound at a speed n times higher than the normal playback speed, the rotary head is expected to traverse $(n+1)$ $(1+36/180)$ tracks $((n-1)(1+36/180)$ tracks in the case where the tape is moved in the fast forward mode). Since the azimuth conforms on every other track, the envelope of the RF signal of a playback signal becomes what is shown in FIG. 2. In other words, the playback signal level becomes higher on the track where the azimuth conforms to what is intended, whereas the level becomes lower on the track where the azimuth does not conform. When the playback signal level becomes low, noise will increase, thus causing the code to be unreadable. Accordingly, the disadvantage is that the time required for retrieving is long in the conventional apparatus because it is impossible to set a significantly increased travel speed during retrieving. It has been possible to achieve a fast mode speed several times higher than the playback speed at the most.

FIG. 3 is a block diagram of a conventional helical scan magnetic playback. In FIG. 3, piezo-electric elements 3 and 4 are the driving means for driving the rotary heads 1 and 2 and installed 180 degrees apart from each other. Amplifier circuits 45 and 46 amplify the signals from the rotary head 1 and 2 and apply them to a switch circuit 47, respectively. The switch circuit 47 operates to alternately select one of the signals from the rotary heads 1 and 2 corresponding to head switching signals. The output from the switch circuit 47 is supplied to the necessary circuit (not shown) where it is demodulated and displayed on a CRT and so on (not shown). Then it is supplied to a low-pass filter 8 where a pilot signal for tracking is separated and extracted. In other words, pilot signals $f_1$ to $f_4$ having different frequencies are successively recorded on each track of a magnetic tape. The frequency of each of the pilot signals $f_1$ to $f_4$ ranges from, for instance, $6.5f_H$, $7.5f_H$, $10.5f_H$ up to $9.5f_H$ ($f_H$ being the frequency of horizontal synchronizing signal). A reference pilot signal generating circuit 10 is used to successively generate a reference pilot signal having the same frequency as that of the pilot signal $f_1$ to $f_4$. A mixer 9 multiplies the pilot signal from the low-pass filter 8 by the reference pilot signal from the reference pilot signal generating circuit 10 and outputs the best component thereof. A fundamental band-pass filter 11 and an harmonic band-pass filter 12 respectively separate the signal having a frequency of $f_H$ and the signal at $3f_H$ and passes them. Accordingly, the beat component of the fundamental frequency $f_H$ and that of the harmonic frequency $3f_H$ are detected by detectors 13 and 14, whereas the difference between them is produced by a differential amplifier 15. A tracking error signal is thus generated.

The tracking error signal is compared with the output of a D/A converter circuit 19 by a comparator 16. An adder 17 adds $+1$ when, for instance, the tracking error signal is greater than the output of the D/A converter circuit 19 and $-1$ when it is smaller than the output thereof and supplies the incremented or decremented sum to be stored in the shift register 18. The shift register 18 supplies the added signal to the D/A converter circuit 19 and the adder 17 after a predetermined time has elapsed, for instance, the time equivalent to one frame. The signal supplied to the D/A converter circuit 19 is subjected to digital to analog conversion and supplied both back to the comparator 16 and to a low-pass filter 24. The low-pass filter 24 smooths the D/A converted signal and supplies the signal to a driving circuit 6. The driving circuit 25 amplifies the signal and outputs it to the piezo-electric element 3 as a high voltage signal. On the other hand, the signal supplied from the D/A converter circuit 19 to the comparator 16 is again compared with the tracking error signal produced by the differential amplifier 15 and $+1$ or $-1$ is added to the signal supplied by the shift register 18 to the adder 17 depending on the result compared and the added signal is again supplied and stored in the shift register 18. This operation is repeated and so controlled that the transverse position of the rotary head can correctly trace the track. In the same manner, the comparator 20, an adder 21, a shift register 22, a D/A converter circuit 23, a low-pass filter 26 and a driving circuit 7 are provided to rotate another rotary head 2 using a piezo-electric element 4. However, clocking signals control the updating of the shift registers 18 and 22 so that they are alternately updated and so that the piezo-electric elements 3 and 4 altenatively drive the rotary heads 1 and 2.

To provide tracking control for the rotary heads 1 and 2 corresponding to the tracking error signal one frame prior, the shift registers 18 and 22 cause the response speeds of the piezo-electric elements 3 and 4 to be delayed. This is because accurate tracking control will be unavailable to the separate heads if the output of the differential amplifier 15 is directly supplied to the driving circuits 6 and 7.

The conventional apparatus is so arranged as to make the tracking error signal ultimately converge by incrementing or decrementing the output of the shift register 18 or 22, one after the other. Consequently, if 8-bit data is to be stored in the shift register 18 or 22, a lengthy time (128/30=4.2 seconds) will be required to correctly trace tracks by means of the rotary heads 3 and 4. This is disadvantageous.

SUMMARY OF THE INVENTION

Accordingly, an object of this invention is to overcome the defects of the prior art.

More particularly, an object of the invention is to correct the tracking position of a helical scan apparatus so that the tracking is corrected for a variety of circumstances.

Another object of the invention is to allow tracking of the tracks for reading the recorded data on PCM portion of the tracks when the tape is operated at high speed.

Yet another object is to correct the tracking position quickly at the start-up of the tape.

One aspect of the invention can be summarized as a helical scan magnetic playback for recording data on tracks and playing back the data by means of rotary heads. The data is recorded on tracks which are tilted to the direction in which the magnetic tape travels. The playback is equipped with means for driving the rotary heads in the width or transverse direction of the track, in addition to the rotary direction, and further includes a circuit for producing a driving signal having a given waveform. Thereby, the circuit is caused to produce a driving signal at least once during part of the time the rotary head traces the portion of the magnetic tape where location data is recorded during the time the head traces the whole magnetic tape once, even in the case when the magnetic tape travels at a speed higher than the normal speed. The driving signal thus generated by the driving signal generating circuit is supplied to transversely drive the rotary heads during that part of time corresponding to the driving signal, whereas the rotary heads are not transversely driven in their width direction during the remaining time. As a result, only the desired part of a track of the magnetic tape traveling at high speed can correctly be traced by the rotary heads.

In another aspect of the invention, the helical scan magnetic playback comprises means for generating tracking error signals for rotary heads and driving means for driving the rotary heads transversely to the rotary direction using driving signals corresponding to the tracking error signals. Driving signals for driving the rotary heads are added to the multi-valued tracking error signals. A memory stores the signals thus combined, so that the rotary heads are quickly subjected to tracking control respectively with the signals stored in the memory means as driving signals for driving the rotary heads a given time later.

DETAILED DESCRIPTION OF THE PREFERRED EMBODIMENT

Figure 4:
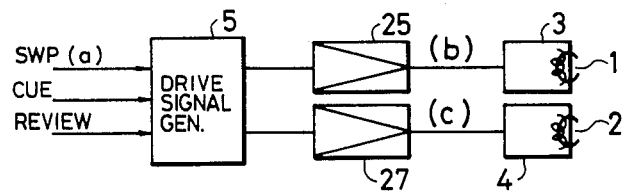
FIG. 4 is a block diagram of a video tape recorder embodying the present invention, particularly in regards to reading PCM data in a fast tape mode.

FIG. 4 is a block diagram of a video tape recorder embodying the present invention, wherein the video tape recorder comprises two rotary heads 1 and 2 mounted 180 degree apart from each other on a rotary drum (not shown). These two heads 1 and 2 are alternatively referred to as heads A and B. The rotary heads 1 and 2 are driven by driving means 3 and 4, such as piezo-electric elements, in the width or transverse direction of the tracks. A driving signal generating circuit 5 has stored therein a switching pulse SWP for switching between the rotary heads A and B. Also stored is a cue signal CUE as a command signal for retrieving a given location by forwarding and rewinding a magnetic tape at high speed. Finally, it stores a review signal REVIEW. The driving signal generating circuit 5 is also capable of producing a driving signal having a given waveform in synchronism with the switching pulse edge timing when the cue or review signal is given. Drivers 6 and 7 are used to amplify and supply the driving signals in the form of high voltage signals to the driving means 3 and 4 for driving the rotary heads A and B, respectively.

Figure 5:
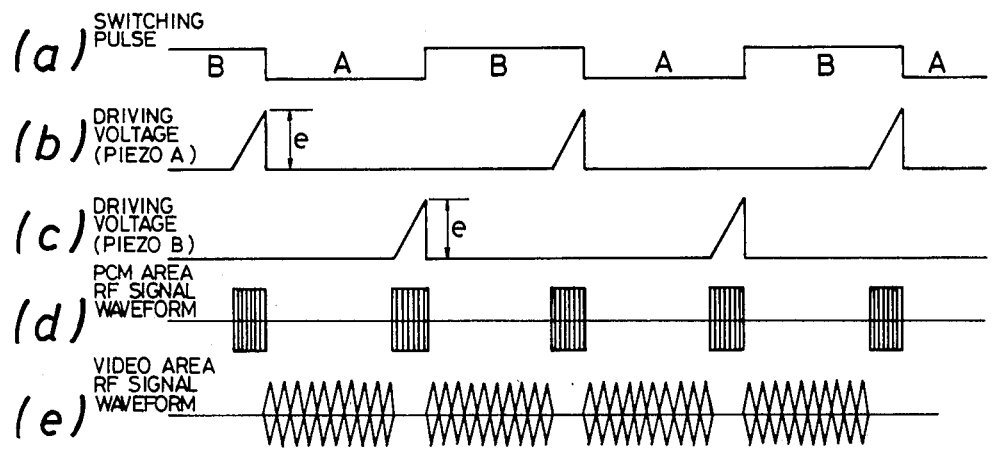
FIG. 5 (a)–(e) is a waveform chart thereof.
Figure 6:
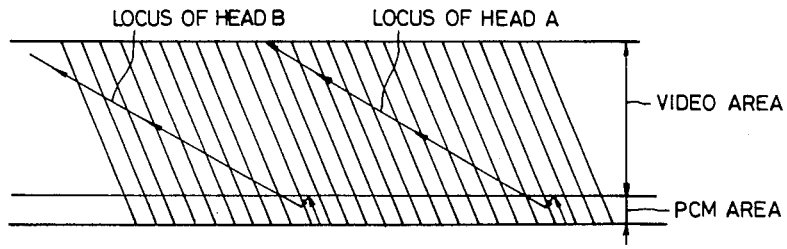
FIG. 6 is a typical plan view showing tracks on the magnetic tape and loci traced by rotary heads.

Referring now to FIGS. 4 and 5, 6 the operation of the video tape recorder will be described. While the magnetic tape is caused to travel at normal playback speed (e.g., in the case of normal playback operatin), a tracking error signal for each of the rotary heads A and B is generated by means (not here shown but to be described later) in synchronism with the switching pulse, shown as signal (a) in FIG. 5. In the case of the tracking system with the so-called four-frequency pilot signal, for instance, the tracking error signal is formed with the beat components of the pilot signal stored on each track and another signal having the same frequency and produced by an external oscillator. The tracking error signals are supplied to the drivers 6 and 7 where they are amplified to become a high voltage signal before being supplied to the transverse driving means 3 and 4. Accordingly, the driving means move the rotary heads 1 and 2 (A and B) in their width directions correspondingly to the tracking error signals so as to provide tracking control.

On the other hand, when the cue or review signal thus generated causes the magnetic tape to travel at a speed n times higher than the normal playback speed in the forward or reverse direction for retrieving purposes, the driving pulse generating circuit 5 produces a saw tooth signal, signal (b) in FIG. 5, in synchronism with the switching pulse, signal (a), when the rotary head A is located in the PCM area (36 degrees). The saw tooth is produced at least once during the time (221 degrees) the rotary head A traces the magnetic tape once from its lowermost to uppermost edge. The operation is the same during the time, as shown by signal (c) in FIG. 5, the rotary head B traces the magnetic tape from its lowermost end to uppermost end. The level e in volts of the saw tooth signal is set at what corresponds to the total width of tracks crossed by each of the rotary heads A or B in the PCM area.

In other words, since the number of tracks crossed thereby in the PCM area become $36(n-1)/180$ during the cue operation and $36(n+1)/180$ during the review operation, given a displacement sensitivity d (micrometer/V) of the piezo-electric element and a width t(micrometer) of a track, the level e of the saw tooth signal during the cue operation becomes $$e = -36t(n-1)/180d \quad (1)$$

and during the review operation becomes $$e = 36t(n+1)/180d \quad (2)$$

Those saw tooth signals are applied to the driving means 3 and 4 through the drivers 6 and 7. In consequence, the rotary heads A and B are driven by the driving means 3 and 4 and caused to trace the magnetic tape as shown in FIG. 6. As shown in FIG. 6, the rotary heads A and B are made to trace the magnetic tape along the circumferential direction of the rotary heads A or B from the tape's lowermost edge to the uppermost edge when they are not driven by the saw tooth signals. However, since the saw tooth signal is applied to the rotary head when it is in the PCM area sometime during the time it takes for the total trace from its end to uppermost edge, it causes the rotary head to correctly trace a track from the lowermost edge to the end of the PCM area. Thereafter, the saw tooth signal falls to zero and the rotary head movement returns to the same operation in the video area as it would have done unaffected by the saw tooth signal. Although the video data recorded in the video area is played back with noise, as shown by signal (e) in FIG. 5, the code data recorded in the PCM area can be played back without noise and thus made readable, as shown by signal (d) in FIG. 5. As code data (location data), possible data includes, but is not limited to, program numbers, time duration (hours, minutes, seconds) from the starting points of the magnetic tape or of the program, recorded dates, etc. Recording forms need not always be of digital type.

Assuming the maximum displacement of a piezo-electric element to be, for instance, 200 micrometers and the width of a track to be 20.5 micrometers, n=49 and n=47 are respectively obtained as maximum values in equations (1) and (2) by substituting the above values. This means data can be retrieved by transporting a magnetic tape at a speed 49 or 47 times higher than the normal playback speed.

Although it has been so arranged that the PCM area provided at the lowermost end of a magnetic tape is played back in the above-described embodiment, a PCM area at any position may be played back if a driving signal is applied with timing shifted from the edge of the switching pulse when a video area is divided into a plurality of PCM areas (five areas, for instance) on which code signals are recorded as disclosed in Japanese Patent Application (OPI) No. 148190/84.

As set forth above, such a helical scan magnetic playback records data on tracks and plays back the data by means of rotary heads with the tracks being tilted to the direction wherein a magnetic tape travels. The playback is equipped with means for driving the rotary heads in the width direction of the track and also includes a circuit for producing a driving signal having a given waveform whereby that circuit is caused to produce a driving signal at least once during part of the time the rotary head traces the magnetic tape where location data is recorded, that is, during part of the time it traces the whole magnetic tape when the magnetic tape is caused to travel at a speed higher than the normal speed. The driving signal thus generated by the driving signal generating circuit is supplied to drive the rotary heads during that part of time corresponding to the driving signal, whereas the rotary heads are not driven in their width direction during the remaining time, so that only the desired part of a track of the magnetic tape traveling at high speed can correctly be traced by the rotary heads and that data such as codes recorded thereon can correctly be read out. Moreover, the magnetic tape can be travel at higher speed since no driving signal is applied in the remaining areas and thereby the retrieval time is shortened.

A more detailed description of the circuitry will be provided following a full description of a second aspect of the invention.

Figure 1:
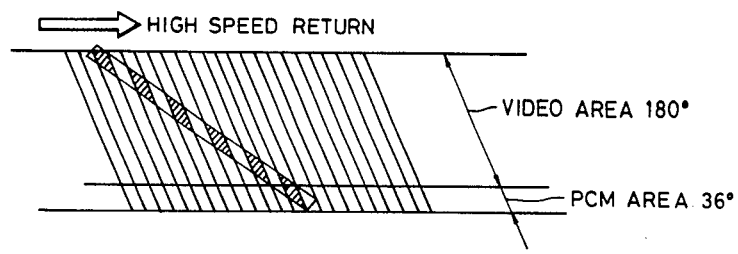
FIG. 1 is a typical plan view showing tracks on a conventional magnetic tape and a locus traced by a rotary head.
Figure 2:
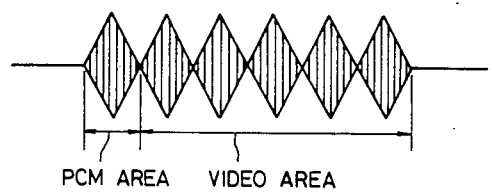
FIG. 2 is a waveform chart thereof.
Figure 3:
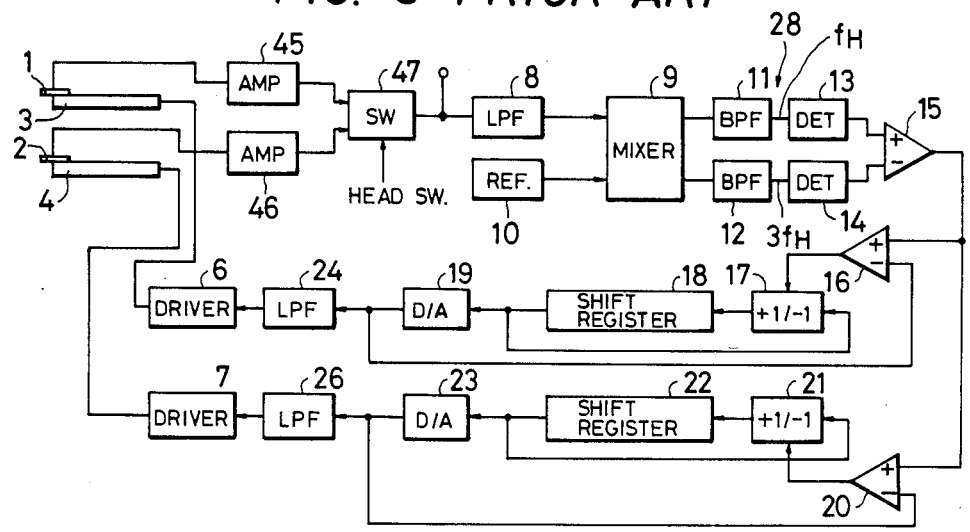
FIG. 3 is a block diagram of a conventional tracking control device.
Figure 7:
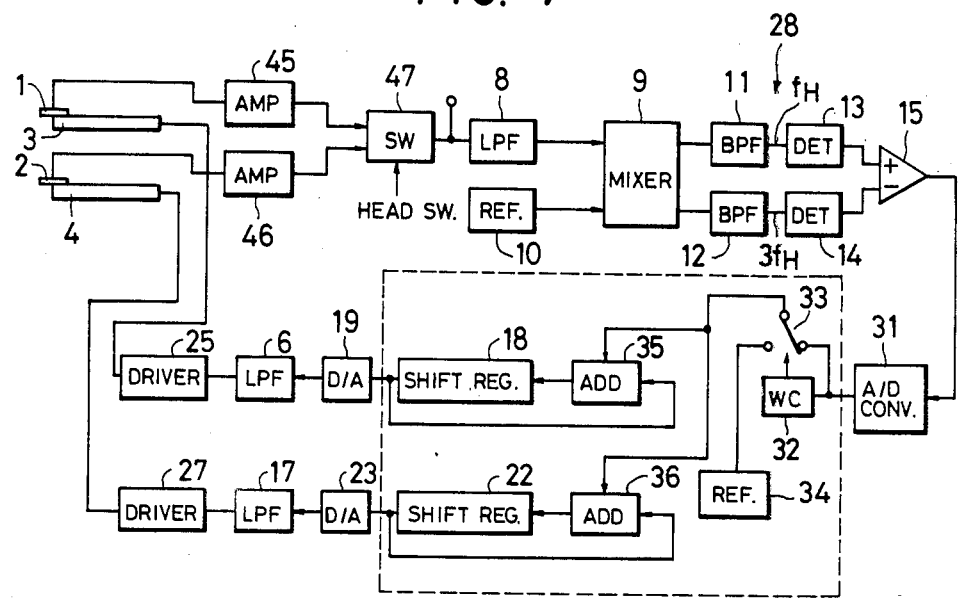
FIG. 7 is a block diagram of a tracking control device embodying the present invention, particularly the fast correction aspect of the invention.
Figure 8:
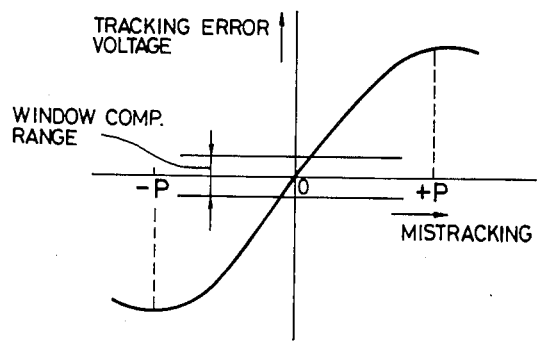
FIG. 8 is a diagram showing the characteristics thereof.

FIG. 7 is a block diagram of a tracking control device embodying a second aspect of the present invention, wherein like reference characters designate like or corresponding parts of FIG. 3 and the description thereof will be omitted. In the present invention, a tracking error signal generated by the differential amplifier 15 is converted from an analog signal to a multi-bit digital one by an A/D converter circuit 31. The tracking error signal converted into a digital form by the A/D converter circuit 31 is supplied to window comparator 32 and a switch 33. The window comparator 32 operates to switch the switch 33 to the A/D converter circuit 31 side when the level of the tracking error signals is outside a predetermined range, as shown in FIG. 8, and to a reference signal generating circuit 34 side when it is within the range. Needless to say, it may be so arranged as to cause the window comparator 32 to detect the tracking error signal while it remains as an analog signal. The reference signal generating circuit 34 outputs a predetermined reference signal (for instance, an 8-bit signal of all zeroes). The output of the switch 33 is supplied to multi-bit adders 35 and 36, which add the outputs of the shift registers 18 and 22 to the output of the switch 33 and supply the sums to the shift registers 18 and 22, respectively. The adders 35 and 36 perform the addition using a 2's complement arithmetic and are thus capable of performing subtraction. Moreover, the circuits shown by a dotted line may be built using a microcomputer. A tracking error signal generating circuit 28 comprising a low pass filter 8, a mixer 9, a reference pilot signal generating circuit 10, band-pass filters 11 and 12, detecting circuits 13 and 14, a differential amplifier 15, and a circuit comprising low-pass filters 24 and 26 and driving circuits 6 and 7 for driving piezoelectric elements 3 and 4 are the same as in FIG. 3.

The function of the tracking control device according to the present invention will be described. When a power supply is turned on or when tracking control is started, the data in the shift registers 18 and 22 are reset and their memories are set to zero, i.e., eight zero bits. Accordingly, tracking control is started and, when the rotary head 3 traces the first track, the driving signal produced by the shift register 18 is 0, thus causing the piezo-electric element 3 to transversely displace the rotary head 1. In consequence, the tracking error signal converted into a digital form by the A/D converter circuit 31 and produced through the switch 33 is added to 0 in the adder, whereby the tracking error signal of the rotary head 1 is stored in the shift register without being changed. At this time, no clock signal is applied to the other shift register 22 but only the data of the rotary head 1 is stored in the first shift register 18. The input or output of the shift register 22 may, needless to say, be controlled).

Subsequently, when the rotary head B is selected to trace the magnetic tape, the clock is, in turn, applied to the other shift register 22 and no clock is applied to the first register 18. As a result, the tracking error signal of the rotary head B is stored in the shift register 22 without being changed.

When the rotary head 1 traces the magnetic tape again, the data stored one frame before is produced by the shift register 18 as a driving signal for driving the rotary head 1. The driving signal is converted from a digital signal to an analog one by the D/A converter circuit 19 and smoothed by the low-pass filter 24 before being supplied to the driving circuit 25. The driving circuit 25 supplies the driving signal to the piezo electric element 3 as a high voltage signal. Since the signal is a tracking error signal derived during one frame before, it closely resembles the present tracking error signal, whereby the piezo-electric element 2 controls the rotary head 1 so to make it immediately and correctly follow the track being traced. Moreover, the driving signal produced by the shift register 18 is also applied to the adder 35 and added to the existing tracking error signal before being stored in the shift register 18 again.

The same operating is applicable to the case where the rotary head 2 traces the track.

The operation like this is repeated and it has thus been arranged to cause the rotary heads to trace tracks quickly and correctly.

Ideally, the output of the A/D converter circuit 31 should be directly supplied to the adders 35 and 36. However, the tracking error signal contains noise and the driving signal for driving the rotary heads 1 and 2 may be excessively compensated in the feedback loop and track jumping may thus be caused. Consequently, when the output of the A/D converter circuit 31 is within the predetermined or dead-zone range of FIG. 8 (the level of the tracking error signal is close to zero), the closeness of the signal is detected by the window comparator 32, whereby a tracking error signal is unambiguously set at zero by the reference signal generating circuit 34 through the switch 33.

The above-described tracking control may be conducted for static image playback and high-speed playback other than the normal one. Moreover, the tracking error signal generating circuit is not limited to what has been described above.

Figure 9:
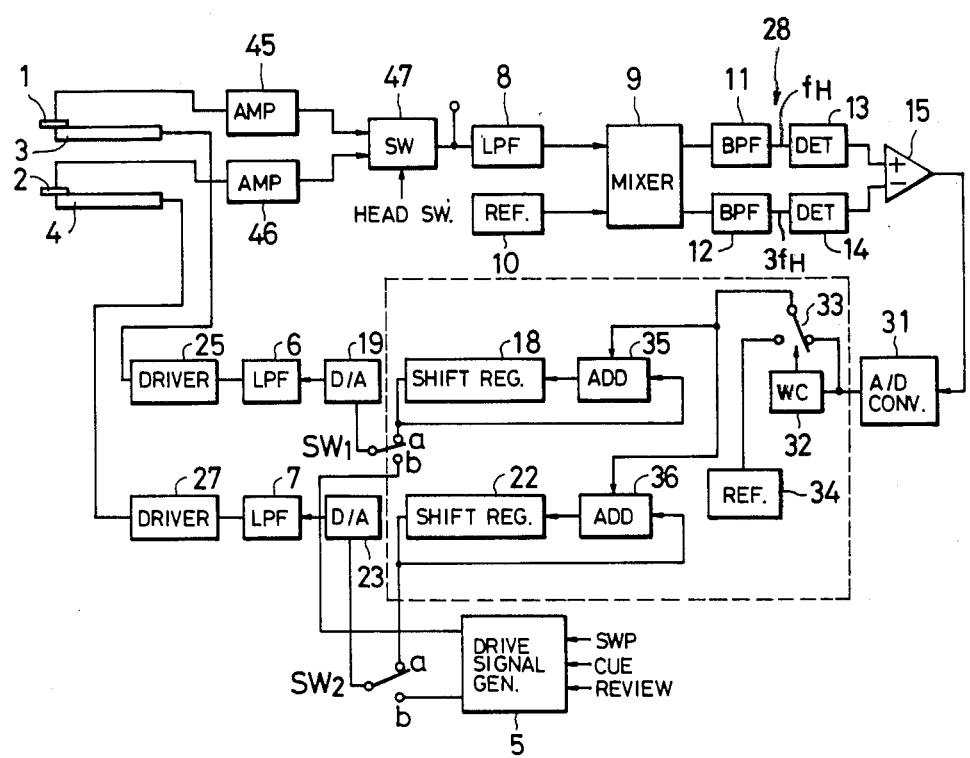
FIG. 9 is a block diagram embodying both aspects of the present invention.

In FIG. 9 is shown an embodiment incorporating both the fast response track position correction and the correction necessary for reading the PCM data during fast tape transport. This block diagram is very similar to that of FIG. 7 so that the fast response operation need not be described in detail. When the recorder is in normal playback or recording operation, two switches SW1 and SW2 are set to respective contacts "a" so as to enable the tracking position correction loop and to disable the drive signal generator 5.

However, when a high speed picture search, such as CUE or REVIEW or other high speed operation, is performed, the switches SW1 and SW2 are both set to respective contacts "b" so as to disable the track position detection loop. Then the drive signal generator 5 outputs digital signals to the D/A circuits 19 and 23 and the analog outputs thereof are smoothed by the low-pass filters 24 and 26. Otherwise, the tracking of the PCM portions during high-speed operation is the same as that described for FIG. 4. Of course, the drive signal generator 5 and the switches SW1 and SW2 could be combined with the tracking control circuit of FIG. 3.

We claim:

1. A helical scan magnetic playback for recording data on tracks of a tape and playing back the data by means of at least one rotary head, the tracks being inclined to a direction of movement of said tape, said playback comprising:

means for moving said rotary head in a direction transverse to said tape movement direction in the plane of said tape; and a circuit for producing a plurality of different, successive values of a driving signal, during a time said rotary head traverses a location data portion of said tape located in a traansverse portion of said tape, for controlling said moving means, wherein said driving signal can cause said head to move a distance selected from a plurality of non-zero distances of a given sign in one rotation of said rotary head, said driving signal being produced once during a complete movement of said rotary head across a width of said tape and being produced only when said tape is moved at a higher of two tape movement speeds, said circuit not causing said rotary head to move in transverse portions of said tape outside said location data portion.

2. A playback as recited in claim 1, wherein said driving signal comprises a saw-tooth signal.

3. A playback as recited in claim 1, wherein there are a plurality of location data portions and a corresponding plurality of driving signals.

4. A playback as recited in claim 1, further comprising means for generating a tracking error signal having more than two possible non-zero values for said at least one rotary head and wherein said circuit produces said driving signal to compensate said tracking error signal, said circuit comprising adding means for adding said tracking error signal to said driving signal.

5. A playback as recited in claim 4, further comprising memory means for storing an output of said adding means, wherein said moving means moves said head to conform to an output of said memory means.

6. A playback as recited in claim 5, wherein said storing in said memory means is performed once per rotation of said rotary head.

7. A playback as recited in claim 4, further comprising:

dead-zone means for setting said tracking error signal to a first predetermined value when its magnitude is less than a second predetemined value.

8. A playback as recited in claim 4, wherein said tracking error signal and said driving signals are multi-bit digital signals and said adding means is a multi-bit digital adder.

* * * * *